UNITED STATES PATENT OFFICE.

LESLIE A. BAKER, OF OLEAN, NEW YORK, ASSIGNOR OF ONE-HALF TO EDWARD A. GOULD, OF SAME PLACE.

PROCESS OF REFINING PETROLEUM.

SPECIFICATION forming part of Letters Patent No. 299,611, dated June 3, 1884.

Application filed January 17, 1883. (No specimens.)

*To all whom it may concern:*

Be it known that I, LESLIE A. BAKER, of Olean, in the county of Cattaraugus and State of New York, have invented certain new and useful Improvements in Processes of Refining Petroleum; and I do hereby declare the following to be a full, clear, and exact description of the invention, such as will enable others skilled in the art to which it pertains to make and use the same.

My invention relates to an improved process of separating crude petroleum into its light and heavy constituents, the object being to simplify the process of refining crude oils and to obtain superior grades of refined oil.

With this object in view my invention consists in separating crude petroleum into its light and heavy constituents by filtering it while below its normal temperature, which may be taken to be its natural temperature, or that which it has as it flows from the well.

One method of carrying out my invention consists in mixing the crude oil with snow or pounded ice, and in placing the mixture upon a filtering-diaphragm of cloth the mesh of which is comparatively coarse, the filtrate being caught in a suitable receptacle located below the diaphragm. The apparatus described above is located in a chamber the temperature whereof is normally maintained at from 2° to 10° below the freezing-point of water. Inasmuch as the snow is not penetrated by the thicker portions of the oil, it forms, as it were, a support for suspending such portions above the filtering-diaphragm, whereby the passage of the filtrate through the same is comparatively unobstructed. The snow also assists the separation of the oil by absorbing the element of naphtha therein. During the operation of filtration the upper surface of the filtering-diaphragm should be continuously scraped to remove such obstructions as may accumulate upon it, the scraping of the diaphragm being accompanied by a continual agitation of the mixture to expose new portions of it to the cloth. In quality the filtrate, or that portion of the oil which passes through the filtering-diaphragm, is not only much thinner than the crude oil, but it contains a lower percentage of coloring-matter, while, on the other hand, the residuum, or that portion of the oil which does not pass through the cloth, is thicker than the crude oil, even at temperatures as high as from 8° to 10° above the freezing-point of water, and it contains a larger percentage of coloring-matter than the crude oil. As regards the specific gravity of the filtrate and residuum, the latter is the heavier. The filtrate thus obtained may be utilized for heating or illuminating purposes without further treatment. If desired, it may be improved in quality by a second filtration at a lower temperature. It is also especially adapted to be converted into water-white oil, the process of conversion involving distillation and the treatment of the distillate with sulphuric acid in the usual manner. Treated in this manner, it yields a higher percentage of water-white oil than the distillate of the crude oil, and with the expenditure of less acid, inasmuch as it contains less coloring-matter than the same. The residuum is removed from the filtering apparatus and sufficiently heated to drive off the naphtha and to melt the snow. This done, it is subjected, with or without the use of snow or pounded ice, to a second filtration, which is conducted under a temperature of from 30° to 60° Fahrenheit. The residuum obtained from this filtration constitutes a fine lubricating-oil, the quality of which is determined by the temperature under which the filtration is conducted, the quality of the lubricant being raised or lowered according as the filtering-temperature is high or low, inasmuch as the amount of the filtrate or comparatively-thin oil separated from the residuum under treatment decreases as the temperature thereof is lowered.

If desired, the residuum derived from the first filtration may be appropriately treated for the separation of its paraffine.

The apparatus for effecting the separation by filtration of crude petroleum in accordance with my invention is susceptible of considerable variation. A filtering-diaphragm of cloth may be relied upon to effect the separation of the oil without other aid; or it may be used in connection with sawdust or equivalent material mixed with the oil instead of snow. Again, the cloth may be dispensed with, and a diaphragm composed of a body of snow, sawdust, or other material employed in its stead. Snow or pounded ice is, however, preferred to other materials, inasmuch as it is most readily removed from the residuum.

So far as the temperatures herein stated are concerned, it is apparent that they may be varied within certain limits, according to the character and origin of the oil being treated, and also according to the peculiar circumstances surrounding each filtration. I would therefore have it understood that I do not limit myself to the apparatus herein described or to the succession of steps under the conditions herein expressed, but hold myself at liberty to make such changes and alterations as fairly fall within the spirit and scope of my invention.

I am aware that it has been proposed to reduce the temperature of mineral oils before filtering by introducing cold liquid into a jacket encircling the filters. Further, I am aware that it has been proposed to filter petroleum-oils by first freezing the oil and then expelling the oil by pressure, and hence I make no claim to such processes. The principal object of my invention is to separate from crude petroleum before it goes into the still that portion which goes to make up the "tar" from which paraffine-oil is now made. This tar interferes greatly with the distillation of petroleum, and it is desirable to remove it before the crude petroleum is placed in the still. The separation of the two constituents of crude petroleum is effected by reducing the temperature of the crude petroleum and then filtering it by gravity, the lighter product passing through the filtering medium, while the heavier product or the residuum is retained above and obstructed by the filtering medium.

Having fully described my invention, what I claim as new, and desire to secure by Letters Patent, is—

1. A process of separating crude petroleum into its light and heavy constituents, consisting in mixing with the crude petroleum a cold medium, and thereby reducing its temperature, and then filtering the same, substantially as set forth.

2. A process of separating crude petroleum into its light and heavy constituents, consisting in mixing with the crude oil snow or its equivalent, and then filtering the oil while at a temperature below the freezing-point of water, substantially as set forth.

3. A process of separating crude petroleum into its light and heavy constituents, consisting in reducing the temperature of the crude petroleum and then filtering it by gravity, and collecting the filtrate or lighter constituent from below the filtering medium and heavier constituent from above the filtering medium, substantially as set forth.

In testimony whereof I have signed this specification in the presence of two subscribing witnesses.

LESLIE A. BAKER.

Witnesses:
EDWARD A. GOULD,
THOS. STORRS.